United States Patent [19]
Martin

[11] 3,988,805
[45] Nov. 2, 1976

[54] METHOD FOR SHUCKING SHELLFISH

[75] Inventor: Roger C. Martin, Cocoa Beach, Fla.

[73] Assignee: Edgar E. Griffis, Brevard County, Fla. ; a part interest

[22] Filed: Jan. 7, 1975

[21] Appl. No.: 539,045

Related U.S. Application Data

[62] Division of Ser. No. 297,309, Oct. 13, 1972, abandoned.

[52] U.S. Cl. .................................................. 17/48
[51] Int. Cl.² ........................................ A22C 29/04
[58] Field of Search .............. 17/48, 45, 74, 71, 53; 99/581, 582, 628

[56] References Cited
UNITED STATES PATENTS

| | | | |
|---|---|---|---|
| 684,088 | 10/1901 | Newman | 99/628 |
| 2,473,609 | 6/1949 | Plock | 17/74 |
| 2,818,598 | 1/1958 | Skrmetta | 17/74 |
| 3,203,034 | 8/1965 | Matzer | 17/74 |
| 3,465,382 | 9/1969 | Meyer | 17/48 |
| 3,528,124 | 9/1970 | Wenstrom et al. | 17/74 |
| 3,698,038 | 10/1972 | Jones, Jr. | 17/48 |
| 3,829,933 | 8/1974 | Lambert | 17/53 |

*Primary Examiner*—Louis G. Mancene
*Assistant Examiner*—James D. Hamilton
*Attorney, Agent, or Firm*—Berman, Aisenberg & Platt

[57] ABSTRACT

A method for shucking and cleaning raw uncooked shellfish of the bivalve type including the steps of opening the bivalve by feeding the shellfish between a moving belt and a stationary plate in order to provide a shearing force. Other steps in the method include, separating the meat from the shells, eviscerating the meat, grading the meat and separating and drying the viscera.

5 Claims, 12 Drawing Figures

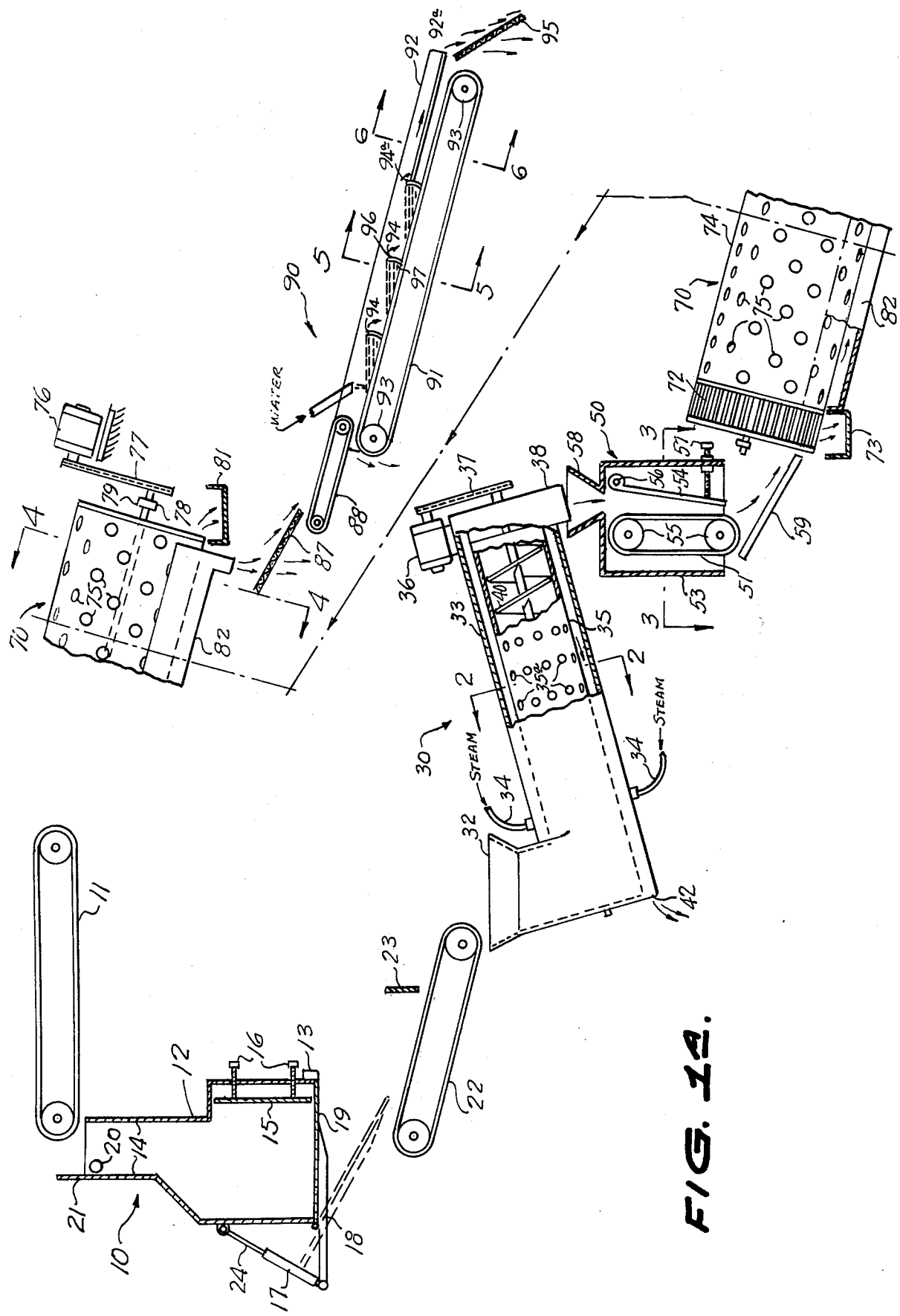

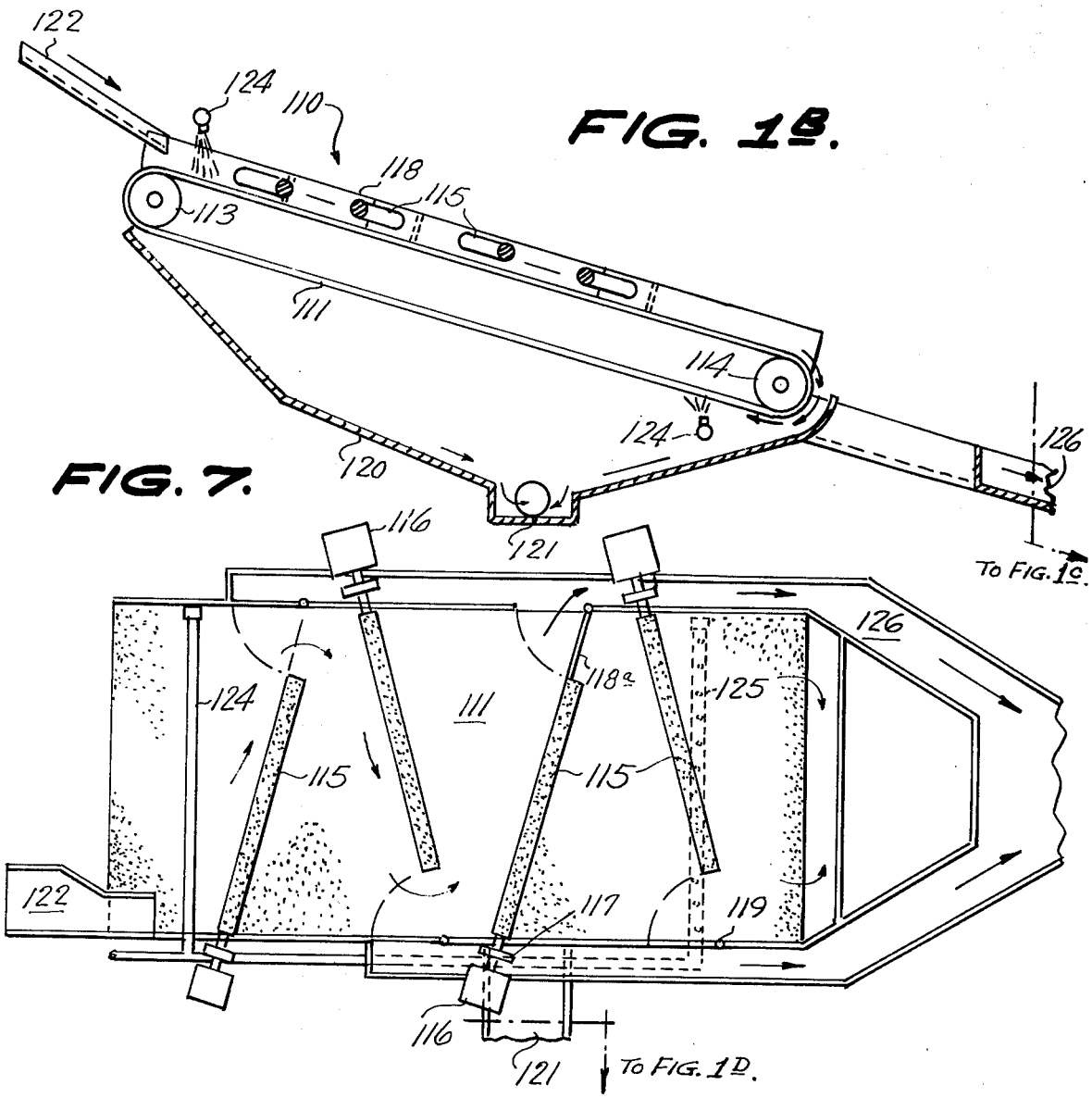
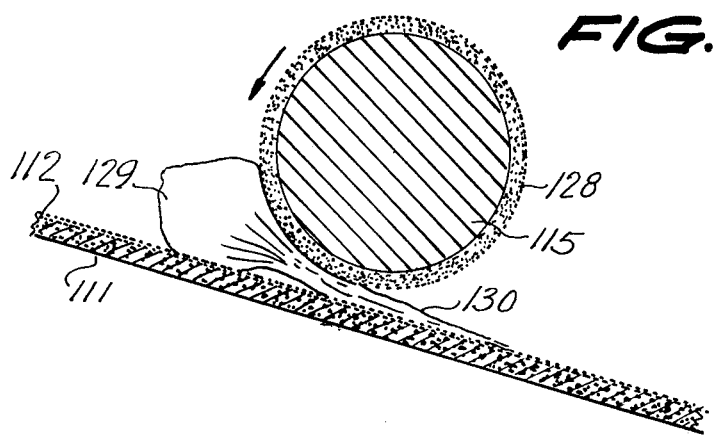

WATER

METHOD FOR SHUCKING SHELLFISH

This is a division of application Ser. No. 297,309, now abandoned filed Oct. 13, 1972.

FIELD OF THE INVENTION

This invention relates to the processing of shellfish of the mollusk or bivalve type in order to prepare the edible meat for human comsumption. More particularly, this invention relates to a method and apparatus for shelling scallops and preparing the scallop meat for consumption.

DESCRIPTION OF THE PRIOR ART

The prior art is replete with examples of semi-automated and automated systems for shucking and cleaning shellfish of the bivalve or mollusk type. One of the chief problems in such prior art systems has been their inability to effectively separate the edible muscle portion of the scallop along with its attached viscera from the shells without causing severe breakage of the shells and the attendant undesirable mixture of shell particles with the scallop meat.

In a typical prior art system the first step in shucking the scallop involves dropping it from a substantial height on to a receiving support. Although not intended to do so, it has been found that this initial shock often results in the breaking of the scallop shell, thus rendering the scallop unsuitable for further processing and eventual human consumption.

In another prior art system, two rollers, rotating in opposite directions, are utilized to effect a so-called "shearing action" on the scallop shells. However, these rollers, which are termed "crusher cylinders" do often, in fact, crush the shells with the above-described undesirable consequences.

In still another prior art system, a scallop is placed by the operator on the end of a sheath on which it travels downwardly and approaches a knife. A rotating drum carrying slats which strike the impaled scallop causes the scallop to open and the meat to be severed by a further double knife section. The disadvantage of this system is its requirement for manual handling of each scallop by an operator and the possibility similar to that described above, that the rotating slats will smash the scallop shell.

Accordingly, it is an object of the present invention to provide a new and improved method and apparatus for processing scallops for human consumption.

Another and more specific object of the present invention is to provide a new and improved scallop shucking device which overcomes the above-described disadvantages in the prior art devices.

SUMMARY OF THE INVENTION

The overall scallop processing system of the present invention comprises a measuring device which automatically feeds a predetermined quantity of scallops to a screw conveyor steamer which cleanses the scallops of dirt, barnacles and the like and kills bacteria. The conveyor feeds the predetermined quantity of scallops to the sheller between a moving belt and a fixed plate. When a scallop comes into contact with the plate and belt, it is subjected to a shearing force which separates the shell halves. The belt speed is adjustable in order to insure that no jam-up of scallops will occur. The shell halves and scallop meat are then conveyed to a trommel which separates small pieces of shell from the meat and shell halves. The meat and additional small pieces of shell, which may have broken off during the sorting process, are then conveyed to an hydraulic separator comprising a sluice in which the meat flows over a series of baffles while the denser shells and other foreign matter sink to the bottom of a trough and are carried away. From the sluice, the meat is conveyed to an eviscerating apparatus where the viscera is separated from the edible scallop meat. Means are provided for conveying the viscera to further processing apparatus, while the meat is fed to a grading cone so that the scallops may be sorted according to size.

BRIEF DESCRIPTION OF THE DRAWINGS

FIG. 7 is a top plan view of the eviscerator according to the present invention;

FIG. 8 is an enlarged cross-sectional detail showing the eviscerating action of the eviscerator of FIG. 7.

DETAILED DESCRIPTION OF THE INVENTION

Figure 1S:
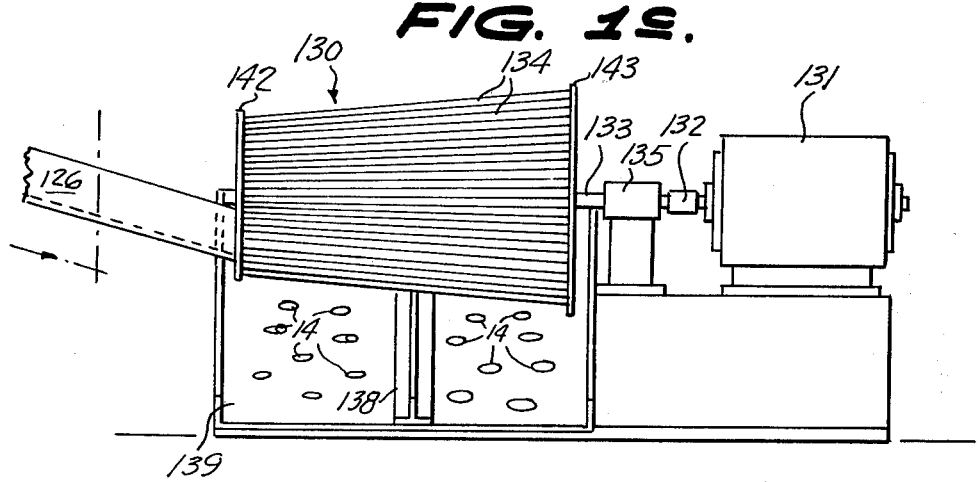
FIG. 1A is a side elevational view of the in-line processing of the scallop according to the present invention comprising the measuring device, the screw conveyor steamer, the sheller, the trommel and the sluice.
FIG. 1B is a continuation of the in-line processing and comprises a side elevational view, partly in cross-section of the eviscerating apparatus.
FIG. 1C is a continuation of the in-line processing of the scallop according to the present invention and comprises a side elevational view of the scallop grading cone.
FIG. 1D is a continuation of the in-line processing of the scallop and comprises a top plan view, partially broken away of the viscera separator.
Figure 12:
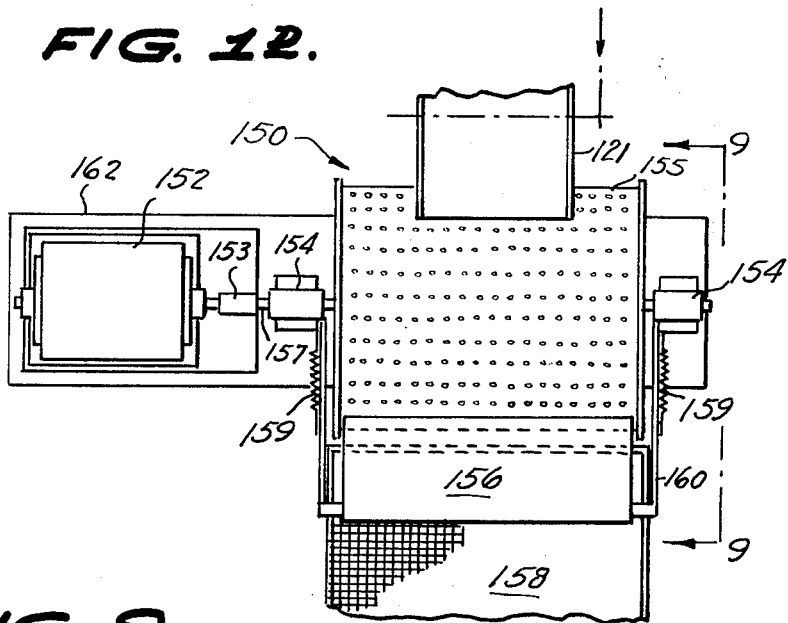

Referring now to the drawings, wherein like reference numerals designate like parts throughout the several views thereof, and starting with FIG. 1A, there is shown conveyor belt 11 for feeding scallops taken from a scallop boat or the like to a measuring device generally designated by the reference character 10. The purpose of measuring device 10 is to automatically feed a predetermined metered quantity of scallops to the further processing equipment within a given time interval and to automatically record the quantity of scallops received from a boat or the like and transferred for further processing. Scallop measuring device 10 is more fully described in my copending application entitled "Scallop Measuring Device", filed on Oct. 13, 1972, Ser. No. 297,312, now U.S. Pat. No. 3,820,394, issued June 28, 1974.

Briefly, scallop measuring device 10 comprises a container 2 of generally rectangular cross-section having an upper constricted neck portion 14 and a lower door 19 hingedly supported by member 18 for permitting the door to swing between the closed position shown in full lines and the open position shown in dotted lines.

The mechanism for opening and closing door 19 comprises hydraulically actuated cylinder 17 which moves piston rod 24 from the fully extended position, as shown in FIG. 1A, to the retracted position, so as to cause door 19 to pivotally open.

Disposed across constricted neck portion 14 is photoelectric cell 20 and light beam source (not shown) which generates an electric pulse each time the light beam is interrupted for a predetermined length of time. Thus, when the scallops or other bivalves have filled container 12 to a point where photoelectric cell 20 is blocked, an electric pulse will be generated. Counter 13 is electrically interconnected with the output of photoelectric cell 20 so that each time an electrical impulse is generated, the count is advanced one unit. Thus, counter 13 automatically records the number of times measuring device 10 is filled and emptied.

The capacity of container 12 may be adjusted by means of movable baffle 15 and adjusting screws 16. Normally, the volume will be approximately 1 bushel.

In operation, scallops are fed by conveyor belt 11 into container 12 and directed downwardly by baffle 21. When the container has filled up past the position of photoelectric cell 20, an electrical pulse is generated. The sensitivity of photoelectric cell 20 is adjusted so that a single shell falling through the beam will not affect it. The generated electrical pulse actuates the hydraulic controls for cylinder 17 to open door 19, deactivates the control circuitry driving conveyor belt 11, causing the belt to stop feeding scallops, and advances counter 13 one count. After a predetermined time delay in the recovery of the photoelectric cell, which may be adjusted, conveyor 11 is again automatically energized, door 19 is closed and the cycle can repeat itself. Counter 13 will thus automatically provide a record of the number of cycles through which the apparatus has gone and consequently a record of the number of bushels of scallops, or other bivalves delivered to further conveyor belt 22.

After a predetermined quantity of scallops or other bivalves has been delivered to conveyor belt 22, it is spread out evenly along the conveyor belt by baffle 23 is a layer one scallop deep, and the scallops are then delivered to screw conveyor steamer, generally designated by the reference character 30. Screw conveyor steamer 30 is more fully described in my co-pending application entitled "Screw Conveyor Steamer for Scallop Processing", filed on Oct. 13, 1972, Ser. No. 297,311, now U.S. Pat. No. 3,811,148, issued May 21, 1974. The scallops are delivered into hopper 32 which is in direct communication with the interior of the screw conveyor steamer.

Screw conveyor steamer 30 comprises an outer jacket 33 of generally cylindrical shape, having disposed therewithin and coaxially therewith an inner jacket 35 having symmetrically, circumferentially disposed orifices 35a in its surface. Orifices 35a are large enough to permit the usual debris to pass therethrough, but not large enough to pass a full sized scallop. Extending coaxially with outer jacket 33 and inner jacket 35, is screw conveyor 40 which is driven by variable speed hydraulic motor 36 and drive gear 37. As screw conveyor 40 rotates, scallops fed to the conveyor through hopper 32 will be conveyed upwardly and to the right, as viewed in FIG. 1A, at a speed which may be adjusted according to prevailing conditions, such as scallop size, relative cleanliness and the like.

In communication with outer jacket 33 are steam lines 34 for introducing steam under pressure through orifices 35a and into contact with the outer shells of the scallops as they are conveyed along by conveyor 40. The steam is thus supplied to the outer surface of the scallops in a substantially 360° pattern, insuring that all the dirt, barnacles and the like are removed therefrom and that the bacteria is killed.

Exit orifice 42 is provided to permit the debris to be washed out and away by the steam condensate on the inner walls of outer jacket 33. Since the screw conveyor steamer is downwardly inclined toward the left, as viewed in FIG. 1A, the debris will naturally be carried away from the system. Cleaned and sterilized scallops will exit through chute 38 and into scallop sheller 50.

Sheller 50 comprises an outer housing 53 within which is disposed a belt 51 mounted on rollers 55 and driven by variable speed hydraulic motor 52. Striker plate 54, which has an abrasive, knurled, checkered or otherwise embossed face 54a, is pivotally mounted on hinge 56 and held at a predetermined angle with respect to belt 51 by adjusting screws 57. The distance between hinge 56 and belt 51 is, in a preferred embodiment of the invention, about 6 inches, while the clearance between the lower portion of striker plate 54 and belt 51 is adjusted by screws 57 between 0 and 3 inches, depending upon the size of the scallops which are being processed. By the same token, the speed of travel of belt 51 may be adjusted from 40 to 400 feet per minute, depending upon the size of the scallops being processed and the other prevailing conditions.

In operation, scallops are fed from exit chute 38 in screw conveyor steamer 30 to hopper 58 and fall into the gradually converging opening between moving belt 51 and striker plate 54. When the scallop comes into contact with both plate 54 and the belt, it is subjected to a shearing force which separates the shell halves. Both the shell halves and the meat fall into a conveyor or chute 59 and proceed to the trommel 70.

The first section of trommel 70 comprises a plurality of one-half inch diameter bars 72, spaced 1 inch from center to center around the periphery of rotating sorting drum 74. The drum is driven by variable speed hydraulic motor 76, drive gear 77, coupling 79 and shaft 78. Small pieces of shell pass through the bars 72 and are carried away by a conveyor or chute 73. The spacing between the bars is too narrow to permit the larger pieces of shell and the scallop meat with attached viscera to fall through.

Sorting drum 74, which rotates between 20 and 25 rotations per minute, is perforated with approximately 1¼ inch diameter holes 75, which are large enough to allow the scallop meat and attached viscera to fall through but retain the shell halves therewithin.

Figure 4:
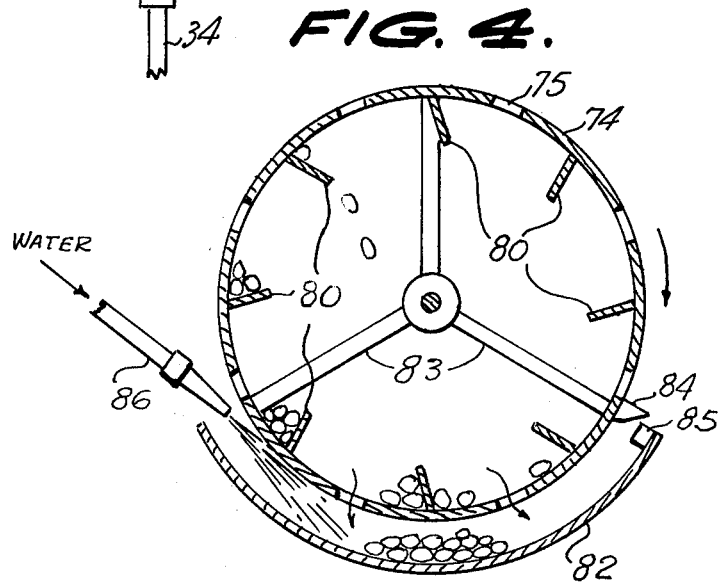
FIG. 4 is a transverse cross-section taken on the line 4—4 in FIG. 1A, showing the internal details of the trommel.

As seen in FIG. 4, sorting drum 74 is provided with a plurality of lift vanes 80 which are bolted inside of the drum parallel to the longitudinal axis and at an angle of approximately 70° to a tangent to the circumference of the cross-section of the drum. These lift vanes pick up the shells and meat, carry them up the side of the drum and drop them back on to the perforated surface. This action serves to advance the movement of shells along the drum, which is inclined to approximately 1 inch per 12 inches of length, and to increase the exposure of the meat to the holes.

The shells, upon reaching the end of drum 74, are carried away by a conveyor or chute 81, while the meat and small bits of shell broken off during the sorting process fall into a receiving tray 82. Braces 83 are provided for supporting the drum sturcture.

Receiving tray 82 is provided with a striker plate 85 which comes into contact with striker block 84 once during each revolution of drum 74. This provides a vibrating motion to the tray which aids water spray 86 in making the meat and shell bits out of the tray and on to screen 87. Screen 87 is provided to separate most of the water from the scallop meat. The scallop meat with attached viscera and small pieces of shell are then conveyed to hydraulic separator or sluice 90 by means of further conveyor 88.

Figure 5:
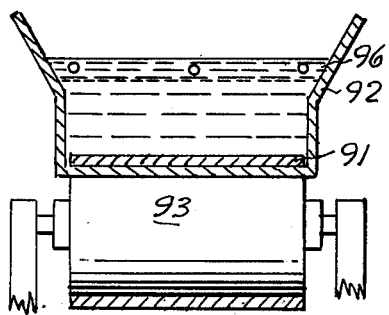
FIG. 5 is a transverse cross-section taken on the line 5—5 in FIG. A, showing a first portion of the sluice.
Figure 6:
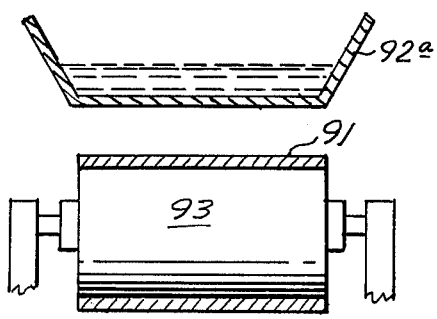
FIG. 6 is a transverse cross-section taken on the line 6—6 in FIG. 1A, showing another portion of the sluice.

The scallop meat with attached viscera and small bits of shell are hydraulically separated by sluice 90. With reference to FIGS. 1A, as well as FIGS. 5 and 6, it can be seen that the sluice comprises a moving inclined belt 91 disposed within trough 92 having an upper portion 92a. A controlled volume of water flows down the belt and over baffles 94.

Baffles 94 comprise a fixed metal bar 96 secured between the sides of the trough and a resilient replaceable flap 97 secured to the bar. Flap 97 provides a water seal with belt 91, while permitting shell bits to be conveyed under it on the belt.

The scallop meat flows over the baffles 94, while the denser shells and other foreign matter sink to the level of belt 91 and are carried away.

At the final baffle 94a in the series, the configuration of the trough 92 changes to a portion 92a which permits the scallop meat with attached viscera and water to be dumped on to screen 95 where the majority of the water is separated. The scallop meat with attached viscera is then conveyed to the eviscerator 110.

Referring now to FIGS. 1B, 7 and 8, there is shown the eviscerator of the present invention. The purpose of the eviscerator is to separate the edible firm muscle protion of the scallop from the undesirable, slimy viscera which holds firmly to the muscle portion and is generally difficult to remove.

The eviscerator 110 comprises an endless belt 111 disposed around rollers 113 and 114 driven in a conventional manner by any suitable variable speed motor. The upper portion of conveyor belt 111 moves from left to right, as viewed in FIG. 1B.

Mounted in suitable mountings 117 are narrow elongated rollers 115 rotatably driven about their longitudinal axes by hydraulic motors 116. The surface of rollers 115 is uniformly coated with an abrasive material 128, such as "Scotch-Tred", manufactured by the Minnesota Mining and Manufacturing Company of St. Paul, Minn. The surface of belt 111 also contains an abrasive coating 112, which may, for example, comprise a fine emery. As shown in FIG. 8, rollers 115 rotate in the same direction as the travel of belt 111, or in a counterclockwise direction, as viewed in FIG. 8. Rollers 115 are mounted approximately one-eighth inch above the surface of belt 111 in order to efficiently grasp viscera 130 between the rotating surface of roller 115 and the traveling surface of belt 111, without dragging the scallop muscle 129 under the roller.

Disposed at opposite sides of belt 111 are upstanding sides 131 having intermittently spaced therealong, deflector plates 118 hingedly mounted to sides 131 at 119. The purpose of these deflector plates 118, as will be more fully explained below, is to permit the cleaned scallop muscles 129 to be removed at any desired point along the travel of belt 111 on to further conveyor 126 for packaging or further processing, as for example at deflector plate 118a, shown in FIG. 7 swung inwardly to its deflecting position.

Disposed respectively above and below belt 111 are water sprays 124, for washing the severed viscera from the surface of belt 111 and into pan 120 for disposal through conduit 121.

The above described eviscerator is described in more detail in my co-pending application entitled "Scallop Eviscerator", filed on Oct. 13, 1972, Ser. No. 297,313, now U.S. Pat. No. 3,802,029, issued Apr. 9, 1974.

From conveyor 126, the eviscerated scallops are fed to a grading cone, generally designated by the reference character 130, as shown in FIG. 1C. The grading cone 130 is comprised of a plurality of equally spaced tubes or rods 134 disposed between end plates 142 and 143. The grading 130 is mounted on shaft 133 for rotation thereabout and is driven by hydraulic motor 131 through coupling 132 and steady bearing 135. Baffle 138 may be adjusted in its position with respect to grading cone 130 so as to change the cut-off point for the different size scallops. Chute or container 139 is provided for receiving the graded scallops.

Since rods 134 are more closely spaced at the left-hand side, as viewed in FIG. 1C and gradually diverge uniformly toward the right-hand side, it is clear that larger scallops 141 will drop to the right of baffle 138, as viewed in FIG. 1C, and smaller scallops 140 will drop to the left. By moving baffle 138 to the left, scallops 140 will encompass a range of smaller sized scallops and scallops 141 will include a broader range of smaller to larger sized scallops, while moving baffle 138 to the right will have the opposite result. It should be clear that more than one baffle, such as 138, may be utilized if it is desired to grade these scallops into more than two distinct groups.

Figure 9:
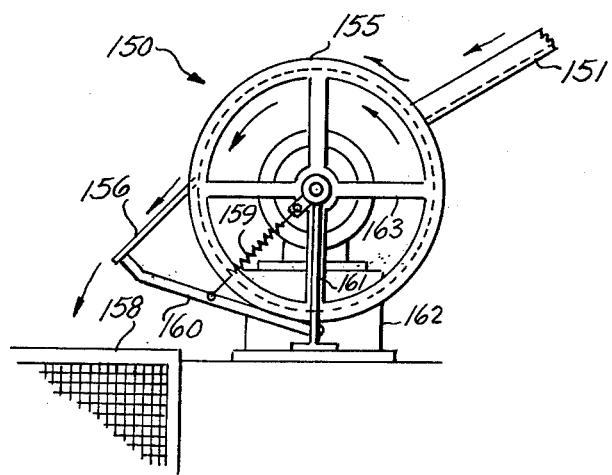
FIG. 9 is a side elevational view looking in the direction of the arrows 9—9 in FIG. 1D, illustrating the viscera separator.
Figure 2:
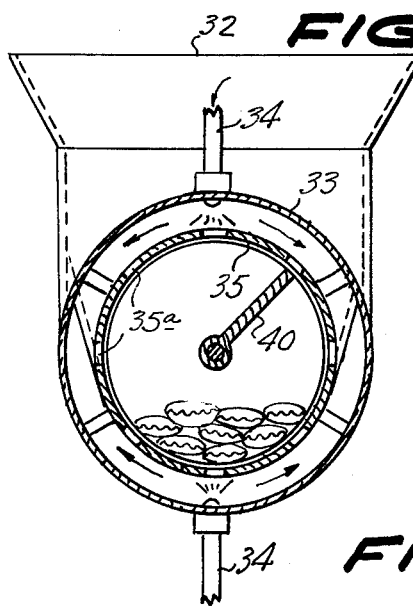
FIG. 2 is a tranverse sectional view taken on the line 2—2 in FIG. 1A, showing the internal details of the screw conveyor steamer.
Figure 3:
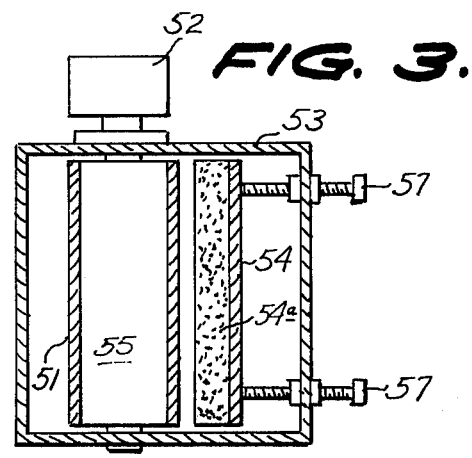
FIG. 3 is a tranverse sectional view taken on the line 3—3 in FIG. 1A, showing the configuration of the sheller.

As explained above, in connection with the eviscerator, the viscera is removed through conduit 121. It has been found, however, that in certain applications, the viscera may have food value and it is, therefore, desirable to separate and dry the viscera. This is accomplished by the apparatus illustrated in FIGS. 1D and 9, and more fully disclosed in my co-pending application entitled "Viscera Separator", filed on Oct. 13, 1972, Ser. No. 297,310.

Viscera separator, generally designated by reference character 150, comprises a hollow perforated drum or cylinder 155, mounted for rotation on shaft 157 by means of support spokes 163. Shaft 157 is journaled in bearings 154 which are mounted on supports 161. Shaft 157 is driven by variable speed hydraulic motor 152 through coupling 153. Mounting unit 162 is provided for supporting motor 152.

Scraper blade 156, which may be formed of relatively thin semi-rigid, substantially rectangular sheet of metal, is supported by arms 160, so that one edge thereof lies across the surface of drum 155 in wiping relationship thereto. Arms 160 are joined at one end to scraper blade 156 and at the other end to vertical supports 161. Connected to the approximate midpoint of arms 160 are biasing springs 159, connected at their other ends to bearings 154, which urge arms 160 upwardly, as viewed in FIG. 9, and therefore retain scraper blade 156 in contact with the surface of drum 155.

Drum 155 is disposed below conduit 121 for receiving viscera on its surface. Located below drum 155 and underneath scraper blade 156 is a box-like container 158, formed of wire screening or the like, for receiving the viscera as scraper blade 156 removes them from the surface of drum 155.

In operation, viscera mixed with water are fed from the eviscerator 110 via conduit 121 on to the surface of drum 155, which is rotating at a constant speed toward scraper blade 156. The water mixed with the viscera passes through the perforations in drum 155, so that the viscera are allowed to become at least partially dehydrated while they remain on the surface of the drum. As the drum passes by scraper blade 156, which is forcefully urged against its surface by springs 159, the viscera will be scraped from the surface of the drum, passed downwardly along the surface of scraper blade 156, as indicated by the arrows in FIG. 9, and be deposited in container 158. The open mesh construction of container 158 will permit the viscera to drain further, if necessary, and undergo further dehydration. When container 158 is sufficiently filled with viscera, motor 152 will be turned off, stopping the rotation of drum 155, and container 158 will be removed to a location where the viscera may be unloaded for further processing, as desired.

There has thus been described a novel apparatus and method for processing scallops and other shellfish of the mollusk or bivalve type, and in particular a novel method and apparatus for shelling such shellfish.

While specific embodiments of the invention have been described and illustrated, it will be recognized by those skilled in the art that various modifications may be made therein without departing from the spirit and intent of the invention. Therefore, it is intended that the scope of the invention be defined only by the claims appended hereto.

I claim:

1. The method of processing shellfish to render them fit for human consumption comprising the steps of:
    a. subjecting the outer surface of said shellfish to steam for cleansing and sterilizing said surface;
    b. subjecting the outer surface of said shellfish to a shearing force by passing said shellfish between a travelling belt and a stationary plate for freeing the meat from the shell;
    c. separating the meat from said shells; and
    d. eviscerating the meat by feeding the meat with viscera attached onto a moving conveyor belt and passing said viscera but not said meat under rollers rotating in the same direction as the movement of said belt.

2. The method set forth in claim 1, further including the step of measuring a predetermined quantity of shellfish prior to the step of subjecting said shellfish to steam.

3. The method set forth in claim 1, further including the step of grading said meat according to size after said eviscerating step.

4. The method set forth in claim 1, further including the step of separating and drying the viscera, after said eviscerating step.

5. The method of processing shellfish to render them fit for human consumption comprising the steps of:
    a. subjecting the outer surface of said shellfish to steam for cleansing and sterilizing said surface;
    b. subjecting the outer surface of said shellfish to a shearing force by passing said shellfish between a travelling belt and a stationary plate for freeing the meat from the shell;
    c. passing the meat and shells through a trommel to discard the large shell pieces and passing the meat and small shell particles broken off in the trommel through a sluice;
    d. eviscerating the meat;
    e. measuring a predetermined quantity of shellfish prior to the step of subjecting said shellfish to steam;
    f. grading said meat according to size after said eviscerating step; and
    g. separating and drying the viscera by depositing the separated viscera onto the surface of a rotating perforated drum and passing said drum beneath a scraper blade so that the viscera are scraped from the drum surface after they have at least partially dried.

* * * * *